US009939861B2

(12) United States Patent
Knepper et al.

(10) Patent No.: US 9,939,861 B2
(45) Date of Patent: Apr. 10, 2018

(54) INFORMATION HANDLING SYSTEM VARIABLE ELEVATION FOR ENHANCED COOLING AIRFLOW

(71) Applicant: Dell Products L.P., Round Rock, TX (US)

(72) Inventors: Lawrence E. Knepper, Leander, TX (US); Gerald R. Pelissier, Mendham, NJ (US); Deeder M. Aurongzeb, Austin, TX (US); David M. Meyers, Round Rock, TX (US); Brian Hargrove Leonard, Austin, TX (US); Mark A. Schwager, Cedar Park, TX (US); Travis C. North, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 56 days.

(21) Appl. No.: 14/878,073

(22) Filed: Oct. 8, 2015

(65) Prior Publication Data
US 2017/0102746 A1 Apr. 13, 2017

(51) Int. Cl.
*G06F 1/20* (2006.01)
*G06F 1/16* (2006.01)

(52) U.S. Cl.
CPC .............. *G06F 1/206* (2013.01); *G06F 1/166* (2013.01); *G06F 1/203* (2013.01)

(58) Field of Classification Search
CPC . G06F 1/166; G06F 1/20; G06F 1/203; G06F 1/206; H05K 5/0234
USPC ....................................... 361/679.54, 679.55
See application file for complete search history.

(56) References Cited

U.S. PATENT DOCUMENTS

| 7,929,292 | B2* | 4/2011 | Li | G06F 1/1616 165/104.33 |
|---|---|---|---|---|
| 2003/0220721 | A1* | 11/2003 | Cohen | G05D 23/1928 700/301 |
| 2015/0001368 | A1* | 1/2015 | Sprenger | G06F 1/166 248/550 |
| 2015/0016057 | A1* | 1/2015 | Fu | F03G 7/065 361/679.55 |

* cited by examiner

*Primary Examiner* — Mukund G Patel
(74) *Attorney, Agent, or Firm* — Terrile, Cannatti, Chambers & Holland, LLP; Robert W. Holland

(57) ABSTRACT

A portable information handling system having a cooling airflow vent located in its bottom surface extends and retracts feet at the bottom surface to aid airflow when the portable information handling system is rested on support surface to impede airflow through the vent. In one embodiment, a microfluidic reservoir communicates pressurized fluid to the plural feet to extend the plural feet if a predetermined thermal condition is detected in the portable information handling system, such as a predetermined temperature, a cooling fan that initiates operation or an impedance to airflow through the vent.

14 Claims, 2 Drawing Sheets

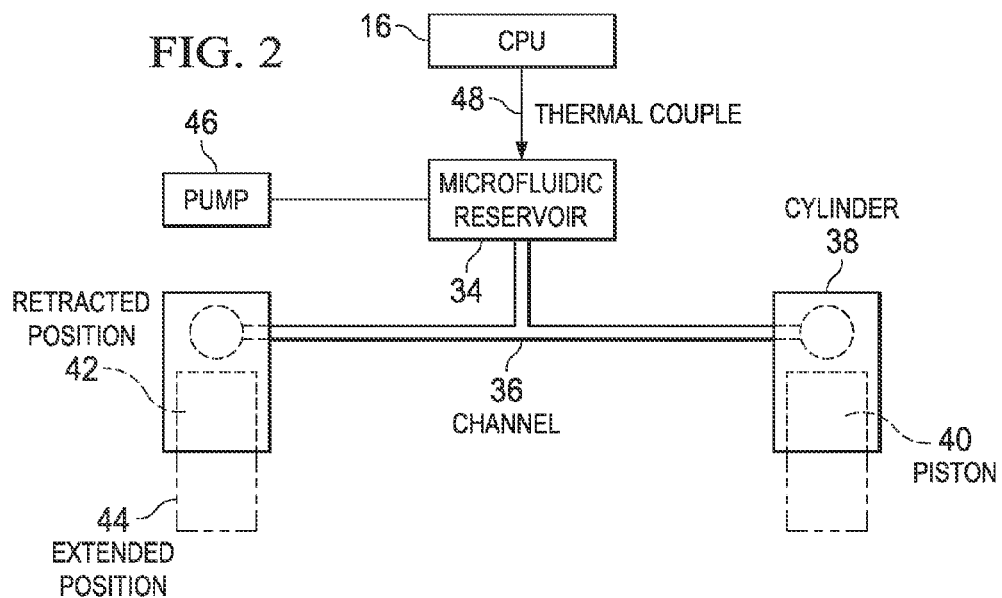
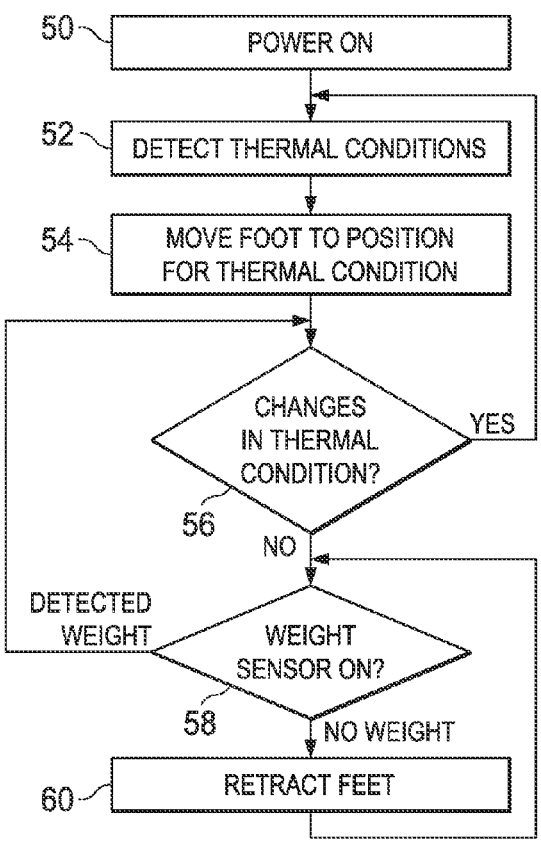

INFORMATION HANDLING SYSTEM VARIABLE ELEVATION FOR ENHANCED COOLING AIRFLOW

BACKGROUND OF THE INVENTION

Field of the Invention

The present invention relates in general to the field of information handling system thermal management, and more particularly to an information handling system variable elevation for enhanced cooling airflow.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Portable information handling systems generally have processing components disposed in portable housings configured to let end users operate the systems without external connections, such as for power and/or input/output (I/O) devices. Typically, portable information handling systems include rechargeable batteries to provide power to processing components and integrated I/O devices to interact with end users. Clamshell or convertible portable information handling systems usually include a main chassis portion rotationally coupled with a lid portion that moves between open and closed positions. The main chassis portion typically has a motherboard with processing components and a physical keyboard to accept end user keyed inputs. The lid portion typically includes a display to present visual information as visual images. Tablet and smartphone information handling systems are typically built in a planar housing that has a display integrated in one side surface. End users generally input information through touches to a touchscreen integrated with the display. Generally, portable information handling systems include wireless and wired interfaces that support other types of data and power communications.

One difficulty with portable information handling systems is that the smaller sized housings typically used to provide user mobility generally have poor thermal management characteristics. For example, thin planar housings generally have poor airflow characteristics so that cooling airflow does not readily pass across heated components. The ability to support adequate cooling airflow is further complicated where an information handling system rests on a planar surface, thus covering or impeding the flow of air at vents in the bottom of the chassis. One way to increase cooling airflow is to include feet on the bottom of the chassis to lift the chassis from a resting surface and allow airflow to pass more readily. However, feet tend to increase the height of the system, which detracts from the typical goal of decreasing system height. Generally end users choose between system size and system performance. Larger sized housings tend to have better airflow characteristics that provide better cooling of internal components. The processing capability of components are typically related to the thermal energy produced by operation of the components so that larger sized housings with better cooling characteristics can include more capable processing components with increased thermal profiles. Even where a larger sized housing is selected for a portable information handling system, impeded venting induced by close proximity with a supporting surface will decrease cooling airflow, impacting component performance where throttling is enforced to reduce thermal energy generation by processing components.

SUMMARY OF THE INVENTION

Therefore, a need has arisen for a system and method which provides information handling system variable elevation for enhanced cooling airflow.

In accordance with the present invention, a system and method are provided which substantially reduce the disadvantages and problems associated with previous methods and systems for supporting cooling airflow at an information handling system to remove thermal energy. One or more feet extend from a portable information handling system housing based on thermal conditions in the housing so cooling airflow is provided at the housing bottom surface as thermal conditions dictate. The one or more feet retract into the housing if the housing is distal a support surface or thermal conditions in the housing are within a desired constraint.

More specifically, a portable information handling system processes information with processor and memory disposed on a motherboard within a housing. Excess thermal energy generated by operation of the processor is released through the bottom of the housing, such through a vent in communication with a cooling fan that draws in cooling airflow to cool the processor. One or more feet disposed in the housing bottom surface selectively extend from and retract into the housing to aid transfer of thermal energy out of the housing based upon thermal conditions in the housing and positioning of the housing on a support surface. For example an actuator interfaced with the plural feet extend the feet as thermal conditions in the housing increase above a threshold and retract the feet as thermal conditions in the housing fall below the threshold. In one embodiment, a microfluidic reservoir in fluid communication with the one or more feet increases pressure to extend the plural feet and decreases pressure to retract the plural feet. Fluidic pressure is generated by a pump based upon temperatures sensed in the housing or alternatively by thermal transfer of energy from the processor to the microfluidic reservoir. In alternative embodiments, alternative thermal sensor and actuators may be used, such as bimetallic spring or synthetic rubber that expands in response to thermal energy.

The present invention provides a number of important technical advantages. One example of an important technical advantage is that a portable information handling system built with a minimal thickness maintains that minimal thickness when idle or operating at lower capacities, yet increases height above a supporting surface when improved thermal management becomes needed. Thermally induced movement of supporting feet selectively raise the system above a supporting surface to enhance cooling airflow as thermal stress increases within the system housing. Automated movement of supporting feet provides end users with improved processing capability as needed while maintaining a thin system profile during operations with reduced thermal stress. The increased airflow reduces thermal throttling of processing components and increases the thermal footprint that a housing will support so that more powerful processing capabilities can be included in thin profile information handling systems.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

FIG. 2 depicts a side view of a system for selectively elevating a portable information handling system with pressurized fluid; and FIG. 3 depicts a flow diagram of a process for managing a portable information handling system elevation based on thermal conditions.

DETAILED DESCRIPTION

Figure 1:
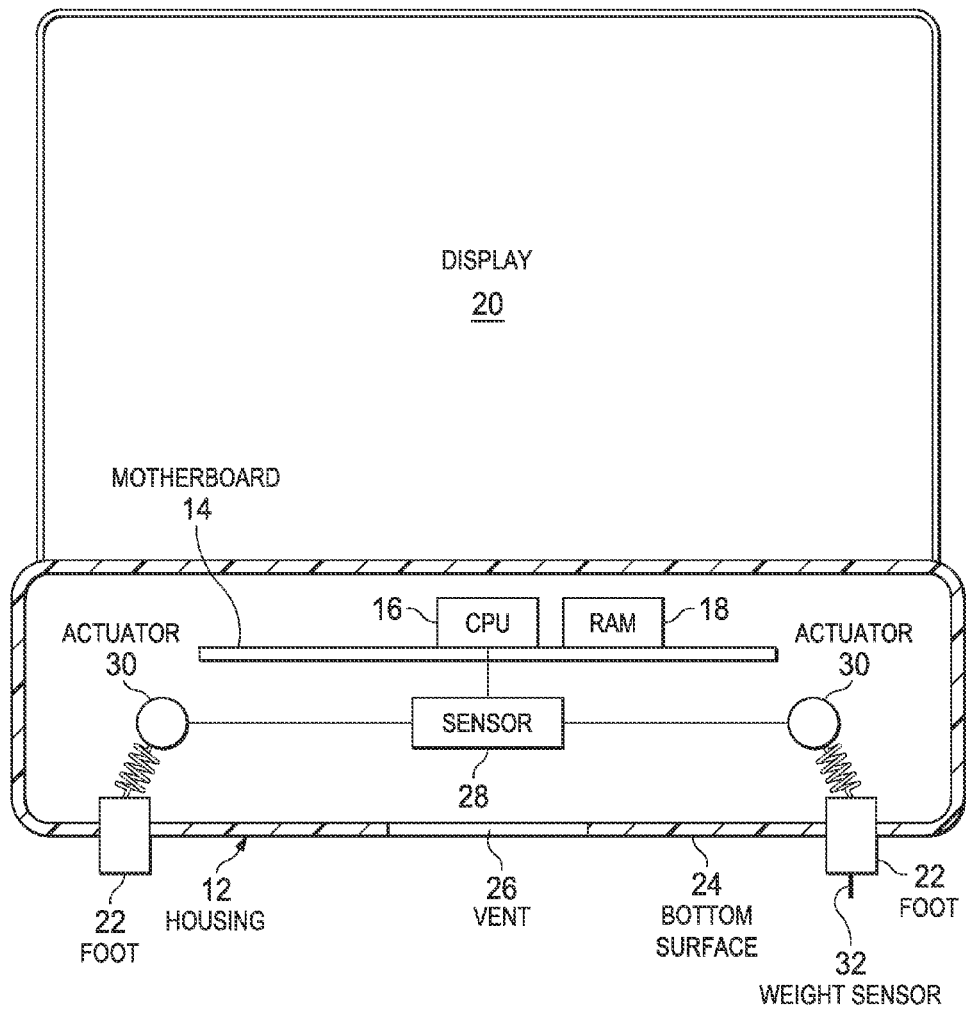
FIG. 1 depicts a side cutaway view of a portable information handling system having variable elevation to enhance cooling airflow.

Selectively extending one or more feet from a portable information handling system enhances cooling by separating the portable information handling system housing from a support surface to provide a path for cooling airflow. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Referring now to FIG. 1, a side cutaway view depicts a portable information handling system 10 having variable elevation to enhance cooling airflow. Portable information handling system 10 is built in a housing 12 that contains a motherboard 14 supporting processing components, such as a CPU 16 and RAM 18. The processing components cooperate to process information, such as by executing an application over an operating system to present information as visual images at a display 20. In the example embodiment, portable information handling system 10 is built in a planar housing 12 to have a tablet configuration. In alternative embodiments, housing 12 may have other types of configurations, such as clamshell laptop or convertible laptop configurations.

During normal operations, portable information handling system 10 executes instructions on processor 16, which generates thermal energy as a byproduct of consumption of electrical power. Thermal energy escapes from housing 12 with passive transfer and/or active transfer. For example, thermal energy passes through housing 12 or passes by transfer to air that flows through housing 12. In the example embodiment, bottom surface 24 of housing 12 includes a vent 26 that provides an airway path for cooling air to transfer thermal energy from processor 16 to the environment external to housing 12. Portable information handling systems 10 with more powerful processing components sometimes include a cooling fan aligned to pass cooling airflow through vent 26 so that active cooling is available during periods of increased thermal stress. In the event that passive and active cooling of thermal conditions in housing 12 does not remove enough thermal energy to maintain processor 16 within thermal constraints, throttling of processor operations may be performed to reduce the amount of thermal energy created by processor operations. End users often have a reduced user experience such conditions since the processor performs operations at a slower speed.

In order to improve airflow impedance through housing 12 during thermal stress, plural feet 22 are disposed at the bottom surface 24 to raise bottom surface 24 up and away from a support surface on which housing 12 rests. By increasing the distance between vent 26 and a support surface, cooling airflow more easily passes through vent 26 to provide cooling for processor 16. However, feet 22 increase the height of housing 12 and can in some instances interfere with use of portable information handling system 10. A sensor 28 disposed in housing 12, such as within or attached to CPU 16, measures thermal energy and, at predetermined levels of thermal energy, provides thermal measurements for the actuator 30 to apply to retract and extend feet 22 at bottom surface 24 to selectively enhance airflow at vent 26. For example, at the predetermined levels sensor 28 engages actuator 30 to extend or retract feet 22. When thermal energy exceeds a threshold, extending feet 22 provides greater room for airflow to enhance cooling within housing 12. When thermal energy decreases below the threshold, retracting feet 22 decreases the height of housing 12. In one embodiment, a weight sensor 32 detects if feet 22 are not against a support surface so that feet 22 can retract and stay out of an end user's way. Although FIG. 1 depicts a vent 26 to allow airflow to pass through, in one embodiment housing 12 is closed and the additional room provided by feet 22 increases airflow along the housing surface to encourage increased passive cooling. In an embodiment that includes a cooling fan to provide active cooling, foot 22 actuation may be managed by the cooling fan controller so that feet 22 extend in proportion to cooling fan rotation speed. In alternative embodiments, variable amounts of extension of feet 22 may be provided as thermal conditions change to help reduce the need for cooling fan operation.

Referring now to FIG. 2, a side view depicts a system for selectively elevating a portable information handling system with pressurized fluid. Processor 16 generates thermal energy as a byproduct of using power and transfers the thermal energy through a thermocouple 48 to a microfluidic reservoir 34. Heating of fluid in reservoir 34 generates pressure at the fluid, which is in communication through channels 36 with a cylinder 38 and piston 40 that actuate to extend and retract feet extending from the information handling system housing. In retracted position 42, piston 40 retracts into cylinder 38 to hold feet within the housing. In the extended position 44, pressure by fluid translated through channel 36 forces piston 40 outwards from the housing to raise the housing relative to a support surface. Although heating of fluid by thermal energy translated from processor 16 provides an automated extension and retraction of piston 40 in proportion to the thermal state within the housing, a pump 46 associated with microfluidic reservoir 34 provides additional control of fluidic pressure for precise management of airflow passage. For instance, if a weight sensor detects that the information handling system is not resting on its feet, then pump 46 can reduce fluidic pressure to retract the feet so that the feet do not interfere with the end users grasping of the housing. Similar other clues may be used to retract the feet when their extension does not aid in the creation of a cooling airflow, such as detection of orientation with an accelerometer or detection of touches at the housing and/or display touchscreen. An advantage of microfluidic pressure to actuate feet is that uniform pressure through the microfluidic system ensures substantially equal extension of feet from the housing to maintain a resting housing stable and flat. In one alternative embodiment, rear feet may extend by an additional distance to provide a slight slant to the housing to aid typing. In one example embodiment, a vent is located at the rear of the housing so that extending feet are only located at the rear of the housing to raise the housing at the vent and provide enhance ergonomics for typing. Although FIG. 2 depicts a fluid based system, air pressure may be used instead, as may solenoid or stepper motor movement. In other alternative embodiments, a thermal couple from the processor to bimetallic springs or heat-sensitive plastics, such as epoxy or polyester polymer, may be used to provide an automated feet extension in response to thermal conditions in the housing. In one alternative embodiment, the fluid used to extend and retract feet from the housing may be an electroviscous fluid that changes viscosity when an electric charge is applied so that a foot extension may be stiffened by applying a charge to the fluid when desired.

Referring now to FIG. 3, a flow diagram depicts a process for managing a portable information handling system elevation based on thermal conditions. The process starts at step 50 with power on of the information handling system. At step 52, thermal conditions are detected within the information handling system housing. For example, where a cooling fan is included, feet extension may he based upon cooling fan control signal and sensors so that airflow is managed based on cooling fan speed. Alternatively, processor temperature sensors or other sensors may be used. At step 54, the feet on the bottom surface of the housing are moved to a position based upon the detected thermal conditions. Feet movement may be automated with thermomechanical controls based upon temperature response of material or may be electromechanically controlled similar to cooling fan operations. At step 56 a determination is made of whether a change has occurred in thermal conditions. If yes, the process returns to step 52 to detect thermal conditions. If not, the process continues to step 58 to detect if weight is on the feet to indicate that the housing is resting on a support surface. If weight is not detected, the process continues to step 60 to retract the feet and returns to step 58 to continue monitoring for weight on the feet. If at step 58 weight is detected, the process returns to step 56 to continue monitoring the thermal conditions.

Although the present invention has been described in detail, it should be understood that various changes, substitutions and alterations can be made hereto without departing from the spirit and scope of the invention as defined by the appended claims.

What is claimed is:

1. A portable information handling system comprising:
   a housing having a bottom surface;
   a processor disposed in the housing and operable to execute instructions to process information;
   a memory disposed in the housing and interfaced with the processor, the memory operable to store the information;
   a display disposed in the housing and interfaced with the processor and memory, the display operable to present the information as visual images;
   a vent formed in the housing bottom surface, the vent providing a cooling airflow path to the processor;
   a plurality of cylinder and piston assemblies disposed on the bottom surface;
   a microfluidic reservoir having fluid in communication with the plurality of cylinder and piston assemblies, the microfluidic reservoir operable to move each piston of the plurality of cylinder and piston assemblies relative to the housing to adjust the bottom surface relative to a support surface based at least in part on thermal conditions in the housing, the microfluidic reservoir moving each piston of the plurality of cylinder and piston assemblies by selectively increasing and decreasing fluid pressure communicated to each piston of the plurality of cylinder and piston assemblies;
   wherein the microfluidic reservoir is in thermal communication with the processor to transfer thermal energy from the processor to the fluid, the fluid varying pressure based on temperature so each piston of the plurality of cylinder and piston assemblies extends from the housing bottom surface as the processor temperature increases.

2. The portable information handling system of claim 1 further comprising a pump interfaced with the microfluidic reservoir and operable to control fluid pressure to the plurality of cylinder and piston assemblies in relation with a thermal condition sensed in the housing.

3. The portable information handling system of claim 2 further comprising a sensor interfaced with the pump and operable to detect housing bottom surface proximity with a support surface, the pump retracting each piston of the plurality of cylinder and piston assemblies if the housing bottom surface is distal a support surface.

4. The portable information handling system of claim 1 further comprising a cooling fan disposed in the housing and operable to generate a cooling airflow having a velocity in relation to thermal conditions in the housing.

5. A method for managing thermal conditions of a portable information handling system, the method comprising:
   detecting a predetermined thermal state of a processor within a housing of the portable information handling system; and
   in response to the detecting, extending each piston of a plurality of cylinder and piston assemblies from a bottom surface of the information handling system housing to raise the information handling system housing relative to a support surface;
   wherein extending each piston further comprises:
   creating pressure at a fluid of a microfluidic reservoir in thermal communication with the processor of the portable information handling system, the fluid in communication with each piston of the plurality of cylinder and piston assemblies, the fluid varying pressure based on temperature; and applying the pressure to extend each piston of the plurality of cylinder and piston assemblies out of the information handling system bottom surface as temperature at the processor increases.

6. The method of claim 5 further comprising:
detecting that the pistons fail to contact the support surface; and
in response to the detecting, retracting the pistons into the information handling system housing.

7. The method of claim 5 further comprising:
detecting a decrease from the predetermined thermal state; and
in response to the detecting a change, retracting the pistons into the information handling system housing.

8. The method of claim 5 wherein creating pressure further comprises creating pressure in relation with the thermal state to the extension of the pistons by a distance in proportion to the thermal state.

9. The method of claim 5 further comprising:
running a cooling fan in the portable information handling system housing to generate a cooling airflow; wherein the detecting a predetermined thermal state further comprises determining the predetermined thermal state when the cooling fan runs.

10. A system for managing thermal conditions in a portable information handling system, the system comprising:
a thermal sensor adapted to sense thermal conditions in the portable information handling system;
a plurality of cylinder and piston assemblies each having a piston disposed at a bottom surface of the information handling system; and
a microfluidic reservoir interfaced with the thermal sensor and the plurality of cylinder and piston assemblies, the microfluidic reservoir configured to extend each piston of the plurality of cylinder and piston assemblies outward from the bottom surface at a first predetermined condition and retract each piston of the plurality of cylinder and piston assemblies into the bottom surface at a second predetermined condition, the microfluidic reservoir pressurizing fluid to extend each piston and removing the pressure from the fluid to retract each piston;
wherein the first and second predetermined conditions comprise a temperature of a processor of the portable information handling system.

11. The system of claim 10 wherein the thermal sensor comprises a thermal couple from portable information handling system to the microfluidic reservoir, the thermal couple transferring thermal energy to pressurize the fluid.

12. The system of claim 10 further comprising a weight sensor disposed on each piston, the microfluidic reservoir retracting each piston if the weight sensor fails to detect weight on each piston.

13. The system of claim 10 further comprising a cooling fan configured to generate a cooling airflow in the information handling system, wherein the first predetermined condition comprises power applied to the cooling fan.

14. The system of claim 10 further comprising a cooling fan configured to draw a cooling airflow through a vent disposed in the information handling system bottom surface, wherein the first predetermined condition comprises impedance of the cooling airflow.

* * * * *